April 15, 1941.  S. TUCKER  2,238,139
AGITATION AND AERATION APPARATUS
Filed Feb. 15, 1940  2 Sheets-Sheet 1
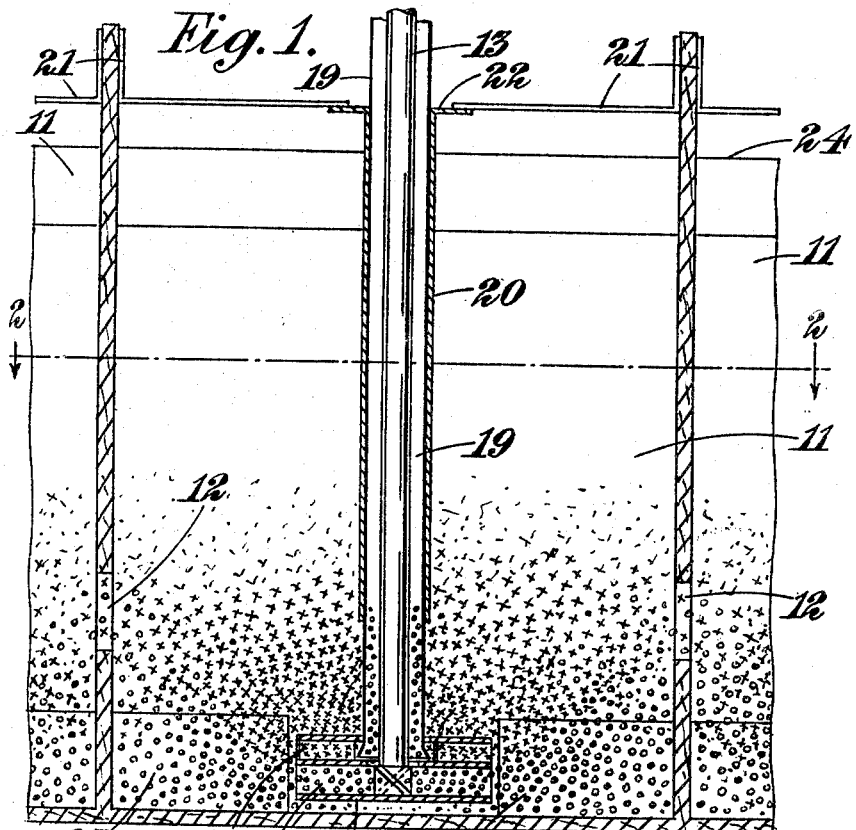
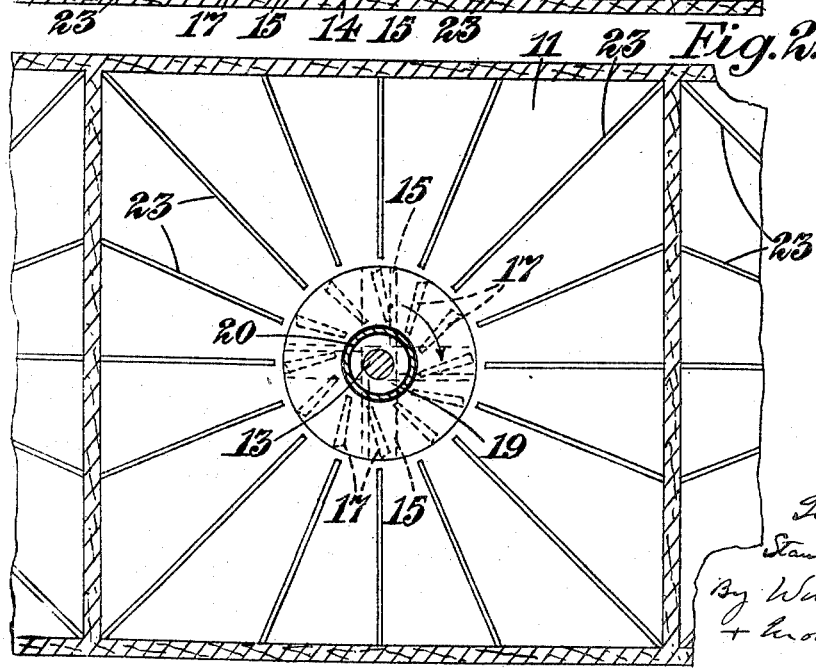

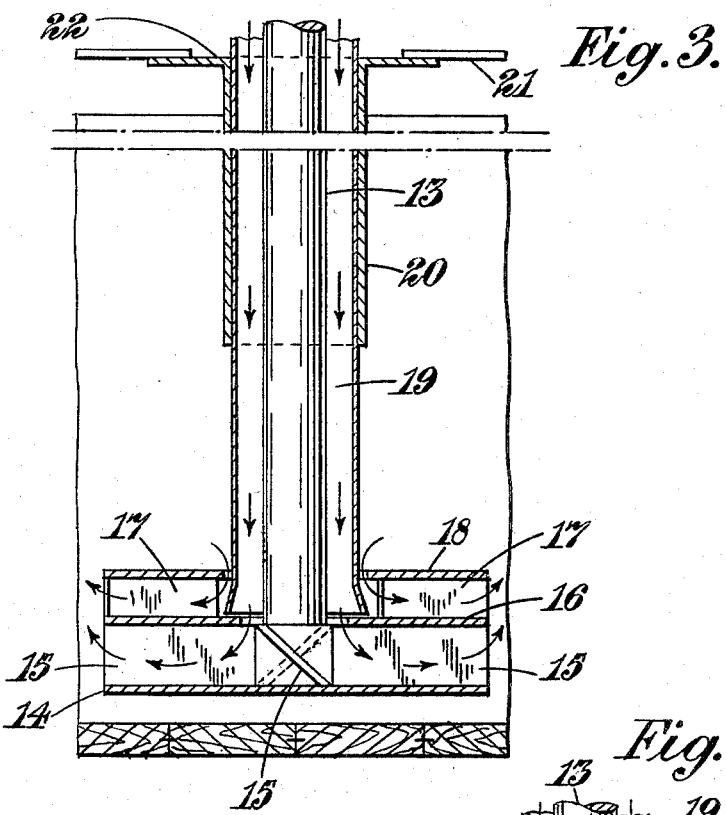
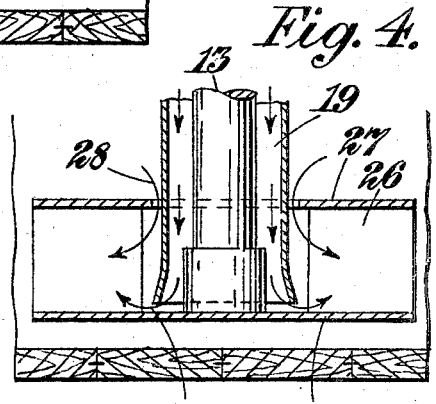
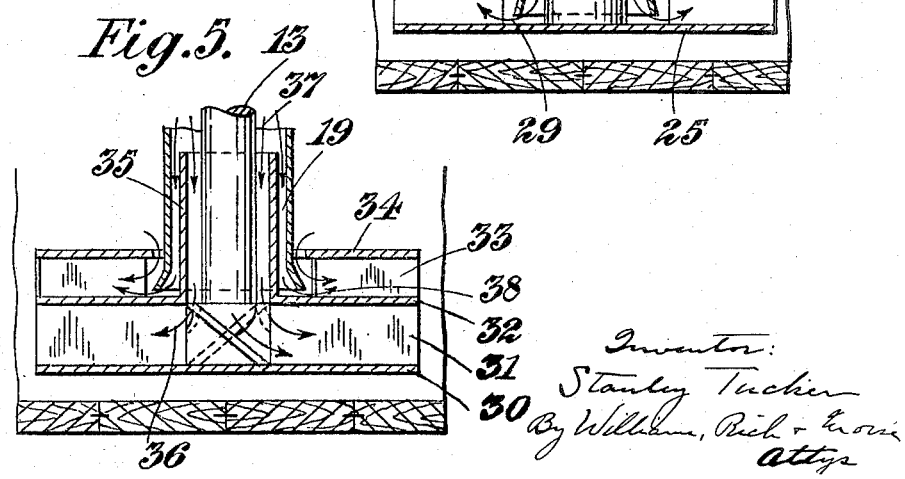

Patented Apr. 15, 1941

2,238,139

UNITED STATES PATENT OFFICE 2,238,139

AGITATION AND AERATION APPARATUS

Stanley Tucker, London, England, assignor to Minerals Separation North American Corporation, New York, N. Y., a corporation of Maryland Application February 15, 1940, Serial No. 318,988
In Great Britain March 22, 1939

8 Claims. (Cl. 261—93)

This invention comprises improvements in or relating to agitation and aeration apparatus.

The present invention comprises in an agitation and aeration apparatus the combination of an agitation-vessel, a downwardly extending rotatable shaft dipping thereinto, an agitator on the shaft comprising a plurality of liquid-agitating blades and means to support the blades from the shaft so that their inner ends are spaced away from the shaft, an annular shield above the blades the central aperture of which surrounds the shaft and is spaced therefrom and a downcast air tube surrounding the shaft with its lower end passing through the shield so that it enters the space within the blades, the diameter of the air tube being such as to allow a liquid-circulation space between the inner periphery of the shield and the outside of the air tube. In this way liquid can be drawn in by the rotating agitator through the space between the air tube and the shield and projected outwardly by the blades due to their centrifugal action. This maintains a constant circulation of any liquid in which the agitating and aerating apparatus is immersed. At the same time air is drawn down the inside of the air tube and delivered at the bottom thereof beneath the level of the liquid circulated by the blades. This air may either be drawn outward beneath the liquid by the blades already described or it may be delivered to a second air-impelling set of blades beneath the first, as may be desired. The effect is that air is driven into the liquid at a level below that of the agitation induced by the agitator blades and as the air tends to rise in the liquid it is necessarily involved in the zone of agitation and becomes thoroughly broken up and incorporated in the liquid.

The agitator may be disposed in an agitation vessel near the bottom thereof. The blades of the agitator may be shrouded by a disc attached to their undersides. Alternatively they may be unshrouded and work close to the bottom of the cell.

The following is a description of certain specific forms of agitation and aeration apparatus in accordance with the invention, which are given by way of example. All these forms are primarily intended to be employed in combination with apparatus for the froth flotation concentration of minerals, but it is to be understood that they can alternatively be employed in any other form of apparatus where efficient agitation and aeration of the liquid is desired.

The apparatus is illustrated in the accompanying drawings in which:

Figure 1 is a vertical central section through a portion of froth flotation apparatus in accordance with the invention;

Figure 2 is a sectional plan taken upon the line 2—2 of Figure 1;

Figure 3 is a detail of the agitator illustrated in Figure 1;

Figure 4 is a detail of a modified form of agitator, and

Figure 5 is a detail of a further modification.

Referring to Figures 1 to 3 the apparatus comprises an agitation vessel 11 which in the case illustrated is a froth flotation concentration cell. One such cell may be used or a number of such cells may be arranged side by side as shown in the drawings with intercommunication openings 12 between them. A vertical shaft 13 dips into each of the cells 11 and supports at its lower end a disc 14 on which are four inclined agitating blades 15. The upper edges of these blades support a second separating disc 16 and upon the disc 16 there are a number, say twelve or sixteen, of upstanding blades 17 which are set so that their front faces slope to the rear of a radial line drawn through their inner edges, as best seen by the dotted lines in Figure 2. The inner edges of these agitator blades 17 are spaced a convenient distance, for example four inches in a fifteen-inch impeller, from the axis of the shaft 13. Above the blades 17 there is a flat annular shield 18 of metal which covers over the upper edges of the blades 17 and has an interior diameter in the case stated of about six inches.

Surrounding the shaft 13 and concentric therewith is a downcast air tube 19 of somewhat smaller diameter than the central aperture in the shield 18. The lower end of the air tube 19 is somewhat flared outwardly but not to an extent sufficient to prevent it from passing through the aperture in the shield 18. The air tube 19 is supported in a surrounding tube 20 which at the upper end is secured to brackets 21 by means of a flange 22. The air tube 19 is made adjustable in the tube 20 so that its height can be varied as desired. The shaft 13 passes upwardly beyond the top of the air tube 19 and is provided with a driving pulley or other means, not shown in the drawings, to permit it to be rotated with a peripheral speed of 1500 to 1800 feet per minute.

In use the air tube 19 is adjusted so that its lower end is spaced somewhat above the middle disc 16 of the agitator. It will be observed that there is a space between the outside of the tube 19 and the edge of the aperture in the shield 18. When the agitator is rotated at the peripheral speed as above stated, being immersed in a liquid which fills the cell 11, the first effect is to empty the air tube 19 of liquid; thereafter liquid is drawn in through the annular space between the air tube 19 and the shield 18 and is expelled by the agitator blades 17 at the periphery of the agitator. This induces a strong circulation of pulp or other liquid contained in the vessel. Beneath this circulating pulp air is drawn in below the bottom of the air tube and is expelled in a stream with the pulp by the blades 17 and by the lower agitator blades 15. This air is thereby beaten into the pulp. As the air enters the liquid at the under side of the stream of pulp which is drawn in through the space between the shield 18 and the tube 19 it is not only beaten into the pulp but as it rises it enters the stream of pulp and becomes thoroughly incorporated therein.

The height of adjustment of the air tube 19 is a matter of some importance and the best height to meet any particular conditions can readily be ascertained by experiment.

In the vessel 11 baffles 23 are arranged around the agitator. These consist in the illustration shown of upstanding plates secured to the bottom of the vessel 11 and disposed radially. Alternatively they may be at an inclination to the radius around the shaft. They meet the flow of liquid driven out tangentially by the agitator and serve to assist in breaking up the flow and securing a quiescent surface to the liquid. In Figure 1 the formation and distribution of air bubbles is indicated by small circles and the distribution of liquid particles by crosses. In Figure 3 the direction of flow of liquid and air is indicated by arrows. Although a certain number of bubbles are illustrated in the tube 19 around the shaft 13 it must not be assumed that liquid necessarily rises in the tube 19 to the height where the air bubbles are shown. On the contrary in most positions of adjustment of the apparatus the tube 19 will run empty. The circles merely indicate that this tube is characterised by the presence of air rather than of liquid.

In the use of this apparatus the air tube 19 is adjusted so that it is spaced above the central disc 16 by an amount which is sufficient to ensure a good working clearance without causing air, sucked down the central tube 19, to be drawn in to a large extent through the upper blades 17. The liquid is circulated through the upper blades and the bulk of the air is driven into the liquid through the lower blades 15. If this apparatus is used for froth flotation concentration the usual reagents are employed, a froth of material to be concentrated collects on the surface of the liquid and overflows over overflow lips 24. The pulp is fed into one of the end vessels of the series and flows through the openings 12 being treated successively in each vessel. As best seen in Figure 2 the lower air-impelling blades 15 are four in number. If desired this number may be increased and although the bottom blades are shown as inclined like the blades of a screw impeller it is to be understood that upright blades may be employed.

Referring now to Figure 4, this shows a simplified form of agitator used in a similar apparatus to that of Figures 1 and 3. In this case at the bottom of the shaft 13 there is a disc 25 carrying a number of upstanding blades 26 shrouded above their upper edges by a disc 27. There is a downcast air tube 19 as before. The blades 26 are like the blades 17 of Figure 2 but deeper. Liquid is drawn in by the blades through the space between the outside of the tube 17 and the central aperture in the shield 27 as indicated by arrows 28. Air is drawn in through the same blades below the bottom of the tube 19 as indicated by arrows 29. As before the air enters below the liquid and tends on leaving the agitator to rise into the agitated liquid and becomes thoroughly mixed therewith.

Figure 5 shows a third form in which the agitator comprises a lower disc 30, blades 31 thereon similar to blades 15 in Figure 3, an intermediate disc 32, blades 33 thereon similar to the blades 17 of Figure 3 and an upper shield 34 similar to the shield 18. The air tube 19 is provided as before but the difference is that a cylindrical partition 35 is provided which is supported by and stands up from the disc 32, entering the space between the shaft 13 and the air tube 19. This serves to divide the air passing down the tube 19 into two streams, one of which enters through the lower blades 31 as indicated by the arrows 36 and the other and smaller stream of which passes between the partition 35 and the tube 19 and becomes mixed with the liquid by the blades 33 as indicated by the arrows 37, 38. The space between the partition 35 and the tube 19 is kept to a minimum so as to reduce this latter stream of air and the construction tends to ensure more complete separation between the air, mainly driven in by the bottom blades 31 and the liquid circulated by the upper blades 33.

I claim:

1. In an agitation and aeration apparatus the combination of an agitation vessel, a downwardly extending rotatable shaft dipping thereinto, an agitator on the shaft comprising a plurality of liquid-agitating blades and means to support the blades from the shaft so that their inner ends are spaced away from the shaft, a stationary downcast air tube surrounding the shaft with its lower end entering the space inside the inner ends of the blades, and an annular shield above and covering the blades provided with a central aperture surrounding and spaced from the air tube so as to allow a liquid-circulation space between the edge of the aperture in the shield and the outside of the air tube.

2. Agitation and aeration apparatus as claimed in claim 1, wherein a second set of air impelling blades is provided on the agitator below the liquid-agitating blades, to which air-impelling blades air is delivered from the downcast air tube.

3. In an agitation and aeration apparatus the combination of an agitation vessel, a downwardly extending rotatable shaft dipping thereinto, air-impelling blades extending outwardly from the shaft, a disc above the air-impelling blades having a central air-aperture therethrough, liquid agitating blades above the disc, the inner ends of these blades being spaced away from the shaft, an annular shield above the blades the central aperture of which surrounds the shaft and is spaced therefrom and a downcast air tube surrounding the shaft with its lower end passing through the shield so that it enters the space within the blades, the diameter of the air tube being such as to allow a liquid-circulation space between the inner periphery of the shield and the outside of the air tube.

4. Apparatus as claimed in claim 3, wherein the disc which separates the two sets of blades carries an upstanding cylindrical partition which enters the air downcast tube and divides air passing downwardly therethrough into two streams, one entering the lower blades through the interior of the cylindrical partition and the other entering the upper blades through the space between the outside of the partition and the inside of the air tube and being mixed directly with the liquid at the bottom of the air tube by the upper blades.

5. Agitation and aeration apparatus as claimed in claim 1, wherein the downcast air tube is adjustable for height relatively to the rotatable agitator.

6. Agitation and aeration apparatus as claimed in claim 3, wherein the downcast air tube is adjustable for height relatively to the rotatable agitator.

7. Agitation and aeration apparatus as claimed in claim 1, wherein the liquid vessel forms one of a series of flotation pulp vessels for use in the froth flotation process of concentrating minerals.

8. Agitation and aeration apparatus as claimed in claim 3, wherein the liquid vessel forms one of a series of flotation pulp vessels for use in the froth flotation process of concentrating minerals.

STANLEY TUCKER.